H. P. STEWART.
WEEDER.
APPLICATION FILED MAR. 11, 1911.
993,900.
Patented May 30, 1911.
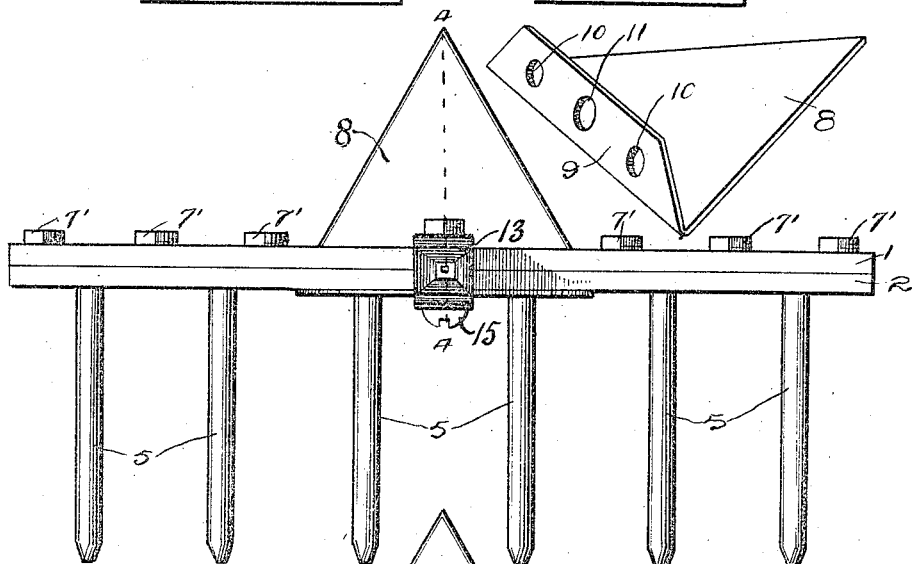
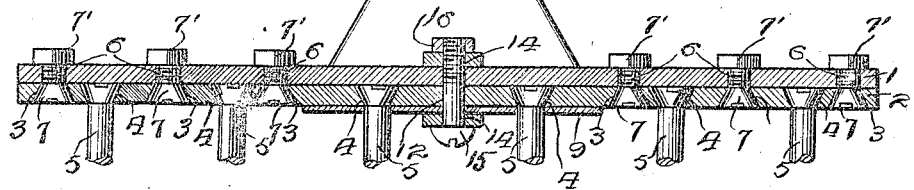
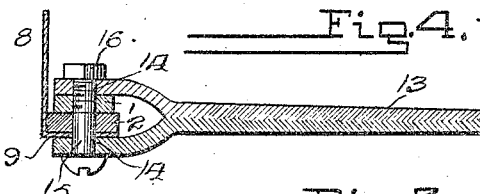
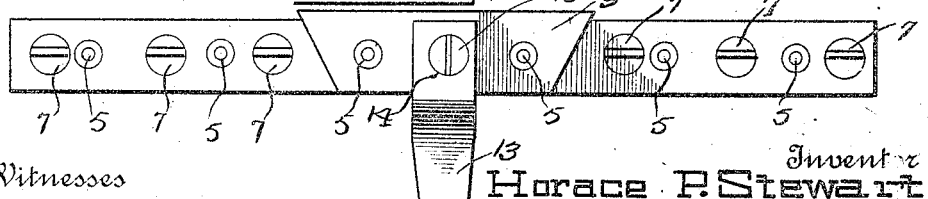
Witnesses
Howard F Costello
Ross J Woodward
Inventor
Horace P. Stewart
By E. E. Thomas
Attorney.

UNITED STATES PATENT OFFICE.

HORACE P. STEWART, OF GRAND RAPIDS, MICHIGAN.

WEEDER.

993,900.  Specification of Letters Patent.  Patented May 30, 1911.

Application filed March 11, 1911. Serial No. 613,799.

*To all whom it may concern:*

Be it known that I, HORACE P. STEWART, a citizen of the United States of America, residing at Grand Rapids, in the county of Kent and State of Michigan, have invented certain new and useful Improvements in Weeders, of which the following is a specification, reference being had therein to the accompanying drawing.

This invention relates to gardening implements and the principal object of the same is to provide an improved means for securing a hoe blade to a rake so that the hoe will be held rigidly in position and at the same time it will be possible to remove the hoe blade when desired very easily.

In the accompanying drawings:—Figure 1 is an end elevational view of the improved rake and hoe. Fig. 2 is a sectional view through the rake and hoe. Fig. 3 is a plan view of the rake and hoe. Fig. 4 is a sectional view along the line 4—4, Fig. 1. Fig. 5 is a perspective view of the improved hoe blade which is secured to this rake.

Referring to the accompanying drawing by numerals it will be seen that this rake comprises a head formed from a pair of plates 1 and 2. The plate 2 is provided with a plurality of frusto-conical openings 3 and 4. The teeth 5 which are used with this rake are preferably large nails which are passed through the openings 4 and have their heads seated within the openings so that they do not project beyond the face of the plate 2. The plate 1 rests upon the plate 2 and upon the heads of the teeth 5 and is provided with openings 6 which register with the openings 3 so that bolts 7 can be passed through the alined openings and hold the plates securely together. These bolts have their heads seated within the enlarged openings 3 and do not project beyond the outer face of the plate 2 and are held in place by the nuts 7'.

The hoe blade 8 is provided with a flange 9 at its base, which is provided with a plurality of openings 10 and 11, the opening 11 being in the center of the flange and the opening 10 positioned to each side of the central opening. This blade is placed against the outer face of the plate 2 with the central teeth passing through the opening 10. An opening 12 is formed through the plates 1 and 2 which is in alinement with the opening 11. The shank 13 of this rake is provided with a bifurcated end in which the plates fit. This bifurcated end is provided with openings 14 which register with the opening 12. A bolt 15 passes through the alined openings and is held in place by a nut 16 so that the shank is securely held to the rake head. It will thus be seen that the hoe blade is securely held in place and that the teeth which pass through the openings 10 prevent the blade from having any pivotal movement whatever. It will be seen that if it is desired to remove this blade or if any of the teeth of the rake become bent or broken that the rake head may be very easily taken apart and the blade removed or old teeth replaced.

What I claim is:—

1. A rake comprising a pair of plates provided with a plurality of openings, teeth passing through certain of said openings, means for removably securing said plates together to retain said teeth in position, a hoeing blade fitting against one of said plates and provided with openings through which certain of said teeth pass, a shank provided with a bifurcated end portion which embraces said plates and blade, said shank, blade, and plates being provided with alined openings, and means passing through said alined openings to retain said shank in position.

2. A rake comprising a pair of plates, one of said plates being provided with a plurality of conical openings, a plurality of teeth passing through certain of said openings and having their heads countersunk in said openings, the other of said plates fitting against said first mentioned plate to hold said teeth in position and provided with openings registering with the remaining of said first mentioned openings, means passing through said registering openings to hold said plates together, a cutting blade mounted upon certain of said teeth, a shank embracing said plates and blade, and common means for holding said blade and shank in position.

In testimony whereof I hereunto affix my signature in presence of two witnesses.

HORACE P. STEWART.

Witnesses:
 SADIE E. HEANEY,
 MERRITT M. DAYTON.